(12) United States Patent
Wan et al.

(10) Patent No.: US 6,477,290 B1
(45) Date of Patent: Nov. 5, 2002

(54) FIBER OPTIC SWITCH USING MEMS

(75) Inventors: Lawrence A. Wan, Malibu; Martin Lim, San Mateo, both of CA (US)

(73) Assignee: Optic Net, Inc., Campbell, CA (US)

( * ) Notice: Subject to any disclaimer, the term of this patent is extended or adjusted under 35 U.S.C. 154(b) by 0 days.

(21) Appl. No.: 09/504,632

(22) Filed: Feb. 15, 2000

(51) Int. Cl.⁷ .................................................. G02B 6/26
(52) U.S. Cl. ........................ 385/17; 385/18; 359/290; 359/291
(58) Field of Search ..................... 385/16–18; 359/291, 359/290

(56) References Cited

U.S. PATENT DOCUMENTS

| | | | | |
|---|---|---|---|---|
| 5,960,131 | A | * | 9/1999 | Fouquet et al. ............... 385/17 |
| 6,195,478 | B1 | * | 2/2001 | Fouquet ........................ 385/17 |
| 6,212,309 | B1 | * | 4/2001 | Nguyen et al. ................ 385/17 |
| 6,229,640 | B1 | * | 5/2001 | Zhang .......................... 359/290 |
| 6,292,281 | B1 | * | 9/2001 | Bala et al. .................... 359/110 |
| 6,292,600 | B1 | * | 9/2001 | Goldstein et al. ............. 385/18 |
| 6,374,008 | B2 | * | 4/2002 | Solgaard et al. .............. 385/17 |
| 6,389,189 | B1 | * | 5/2002 | Edwards et al. .............. 385/18 |

OTHER PUBLICATIONS

*The Economist Magazine,* Feb. 5, 2000, pp. 73,74.
*Wired Magazine,* Feb. 2000, p. 78.
One–page exploded perspective view of what is believed to be a "mirror" of the *Wired Magazine* article above.
Erectable Mirror Design of Sandia believed to be used for optical switching.
International published Application WO99/37013.

* cited by examiner

*Primary Examiner*—Frank G. Font
*Assistant Examiner*—Michael P Mooney
(74) *Attorney, Agent, or Firm*—Coudert Brothers, LLP

(57) ABSTRACT

A fiber optic switch using MEMS is scalable by the use of a matrix of cross-points located at the intersection of all possible input and output light paths. Cross-points are formed by a MEMS procedure where a digitally movable mirror intersects a light path to provide a digital switching action with the remaining cross-point mirrors being moved out of position to provide through transmission.

13 Claims, 8 Drawing Sheets

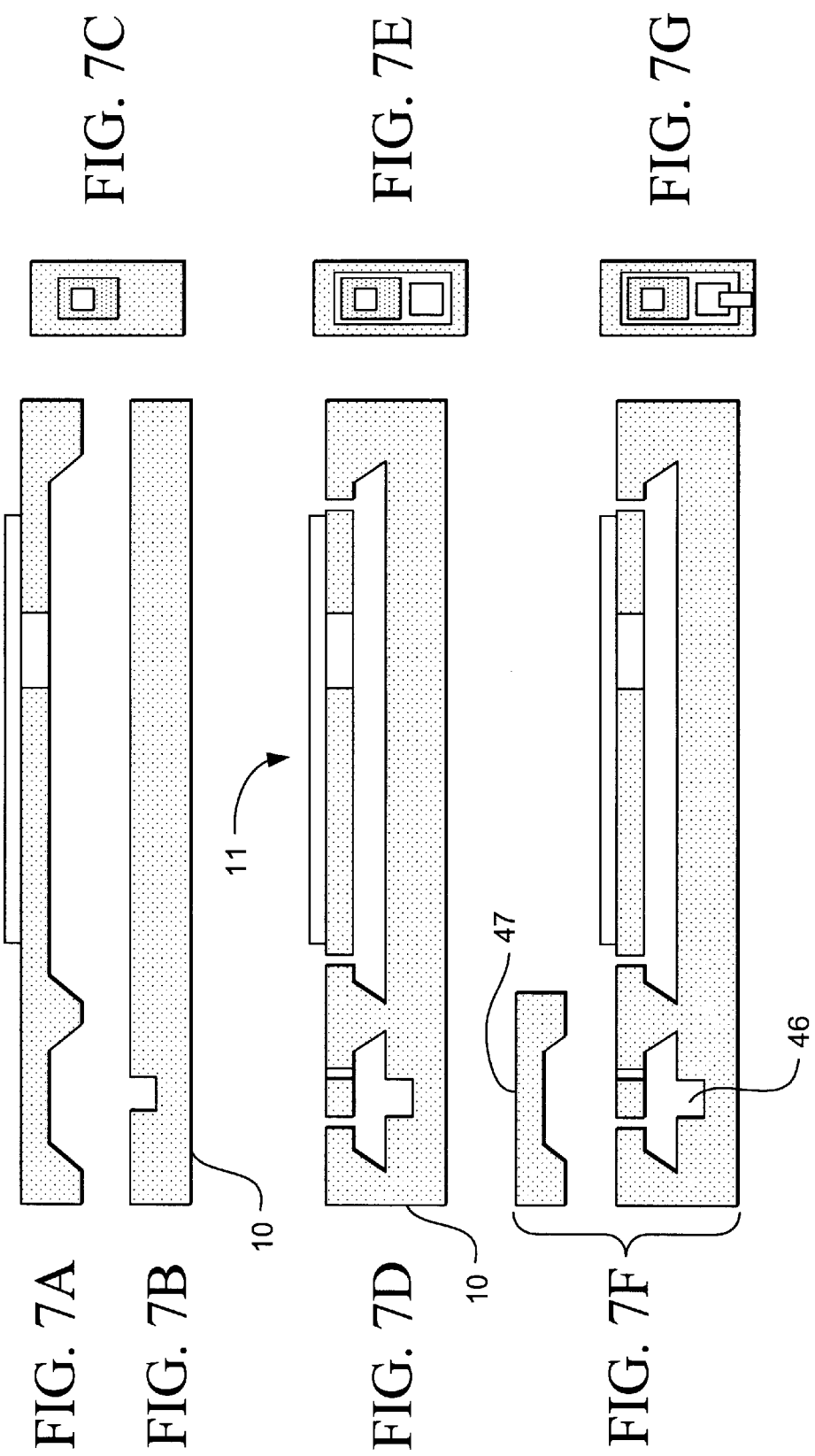

FIBER OPTIC SWITCH USING MEMS

INTRODUCTION

The present invention is directed to a fiber optic switch using MEMS (micro electro mechanical systems), and more specifically to a scalable n×n switch.

BACKGROUND OF THE INVENTION

The great demand for data-centric services brought on by the explosive growth of Internet has led service providers to dramatically increase their capacity. All optical networks (AON) utilizing wave division multiplexing (WDM) is expected to satisfy the bandwidth requirements. As more networking is required at the optical layer, an all photonic switch is emerging as an enabling technology. While most switching in communication systems today is accomplished electronically, emerging AON will require switches to route signals purely in the optical realm to achieve higher bit rates. These network applications require switching matrices from 8×8 to 1024×1024.

Conventional optomechanical switches are mostly available in 1×2 and 2×2 configurations and rely on mature optical technologies. Large scale matrix switches are difficult to realize because of their complexity, size, and the number of moving mechanical parts requiring assembly.

Other attempts at silicon MEM switches are based upon torsional or hinged mirrors which are limited in angular excursion; and require angular sensors for feedback servo control to slew the mirrors into required angular positions. The difficulty in precise angular control and servo mechanisms which limits switching speed have prevented these analog techniques from realizing useful optical switching.

OBJECT AND SUMMARY OF THE INVENTION

It is a general object of the present invention to provide a fiber optic switch which is scalable.

In accordance with the above object, there is provided an optical matrix switch having a plurality of cross-points for switching a plurality of information carrying light beams between any one of a plurality of input beams to any one of a plurality of output beams by choosing the appropriate cross-point of the matrix. Each cross-point is a micro electromechanical (MEM) type mirror having a first position where the mirror reflects the selected input beam to provide a selected one output beam and a second position where it provides a through path for transmission of said light beam. Means are provided for actuating a selected cross-point mirror to a first position to reflect the input beam to the output beam and for causing the remaining mirrors in the path of such beam to remain in the second position to allow through transmission.

In addition, a method is also provided of switching a selected one of a plurality of input optical signal paths to a selected one of a plurality of output optical signal paths comprising the steps of providing a matrix of optical mirrors at all cross-points of the input and output optical paths, selectively and digitally moving a mirror into an optical path to allow a selected input optical path to be reflected to a selected output optical path, and allowing the remaining mirrors in the optical path to provide through transmission.

BRIEF DESCRIPTION OF THE DRAWINGS

FIGS. 7A through 7I illustrate an alternative process for forming a portion of FIG. 1 and mounting it.

DETAILED DESCRIPTION OF THE PREFERRED EMBODIMENTS

Figure 1:
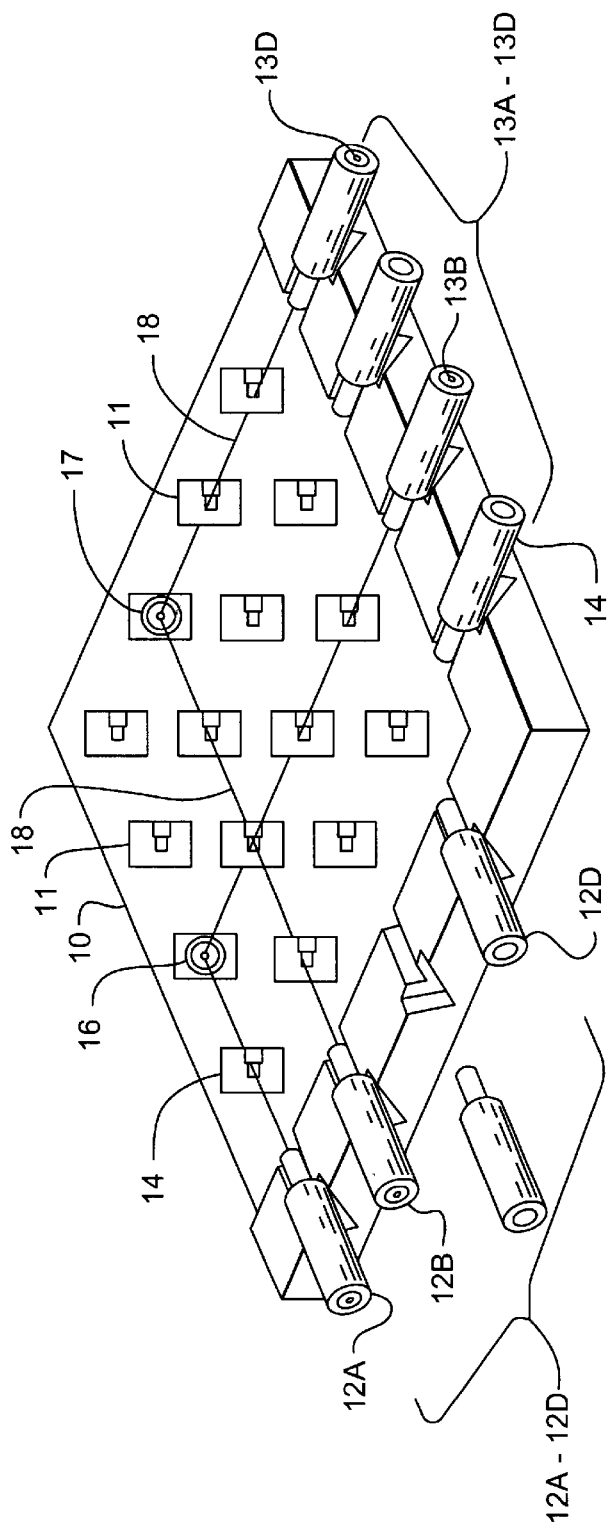
FIG. 1 is a perspective view in simplified form of a fiber optic switch embodying the present invention.

FIG. 1 illustrates a simplified optical matrix switch constructed in accordance with the present invention which is based on micro electromechanical systems. (MEMS). The device includes a silicon or other semiconductor substrate 10 on which is placed a matrix of cross-points 11. These are located at all possible cross-points or intersections of a plurality of input information carrying light beams 12a–12d (many more are possible, of course) and a plurality of output beams 13a–13d. Typically, these would be of fiber optic lines. From a switching standpoint, this is similar to a mechanical cross-bar switch where it is desired to allow any one selected input 12a–12d to be connected to any one selected output 13a–13d. Thus, the cross-points 11 located at every possible switching junction are in the form of mirrors having a first position where the mirror reflects a selected input beam to provide a selected output beam. The mirrors are plasma etched on a mono-crystalline silicon wafer which has been polished to optical flatness.

Figure 3:
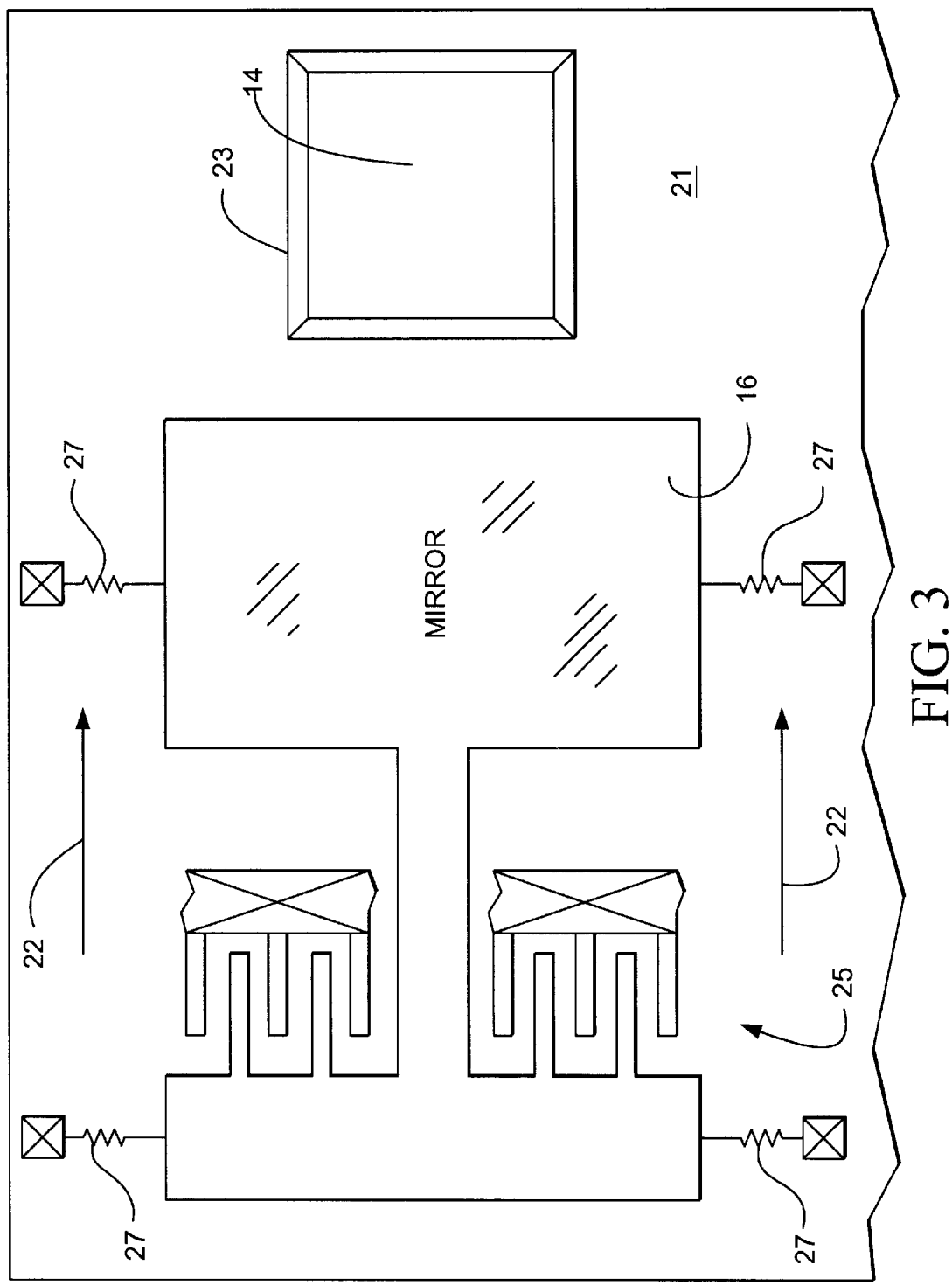
FIG. 3 is a plan view of a portion of FIG. 1 demonstrating its operation.

Thus, in the case of the input 12a, a beam 14 is reflected by a mirror 16 at a right angle and continues on path to the output 13b. Similarly, the input 12b is reflected at the mirror cross-point 17, its light path 18 is redirected to the output 13d. The cross-points 11 provide that the light beams 14 and 18 have clear transmission through all the intervening cross-points 11. As illustrated in FIG. 3, a typical cross-point 11 in one embodiment includes, for example, a movable mirror 16 on a substrate 21 to move in the direction shown by arrow 22 to selectively cover the aperture 23 which, for example, might be in the beam path 14. This mirror is digitally movable between first position to reflect the input beam to the desired output beam path and in a second position where it allows through transmission. Thus, the mirror 16 serves as a type of shutter. Shutter 16 is movable in a single plane, along the surface of the semiconductive base to provide a very stable reflecting surface to provide an exact desired 90° angle of reflection as illustrated in the preferred embodiment. The mirror is movable as illustrated in FIG. 3 by a comb-type actuator 26, which is formed on the semiconductive substrate 21 along with the mirror 16. This comb-type actuator is formed by MEMS technology. Its construction is illustrated in a co-pending application Ser. No. 09/299,472 filed Apr. 26, 1999, entitled Method of Fabricating Angular Rate Sensor From A Structural Wafer Of Single Crystal Silicon and assigned to the present assignee. Also there are several technical articles relating to such MEMS technology. With the comb-type actuator drive an effective spring suspension 27 is provided.

Figure 4C:
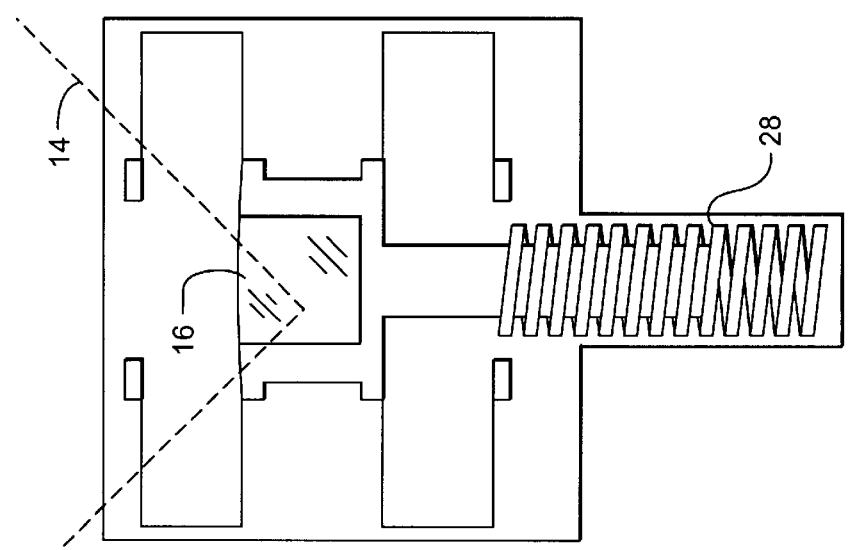
FIGS. 4A, 4B and 4C is an alternative embodiment of FIG. 3.
Figure 4B:
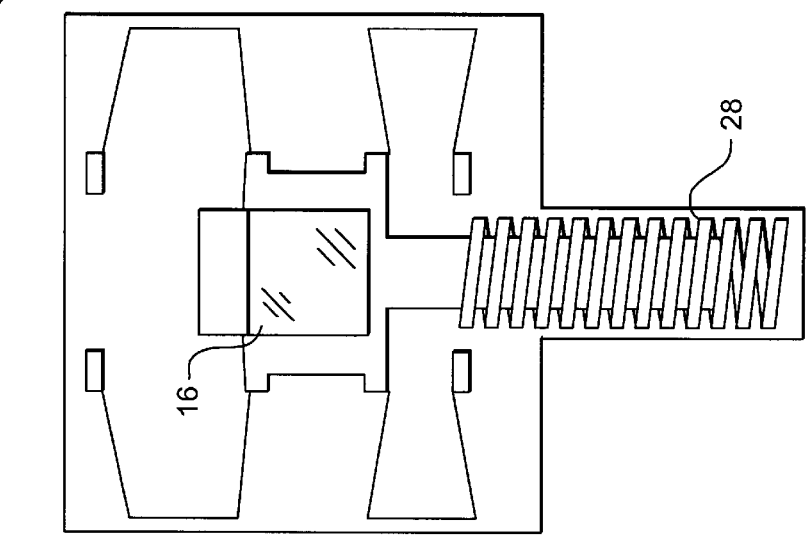
Figure 4A:
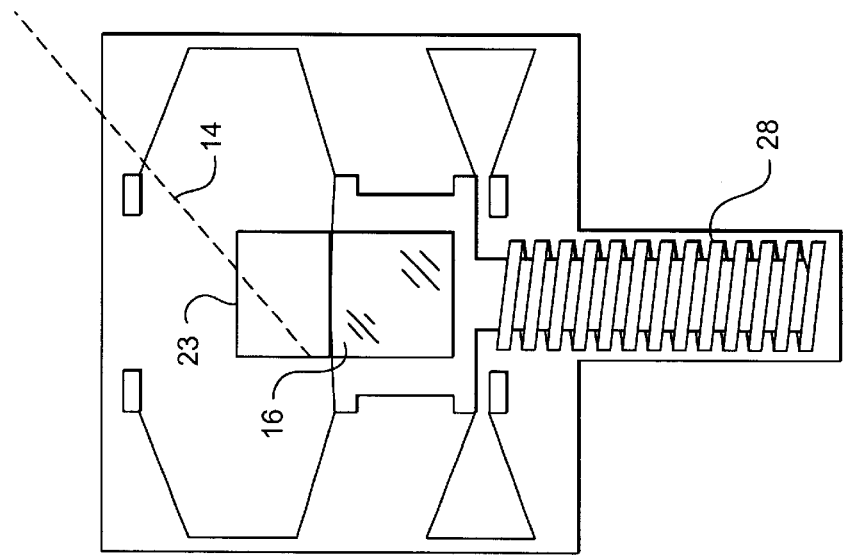
Figure 5A:
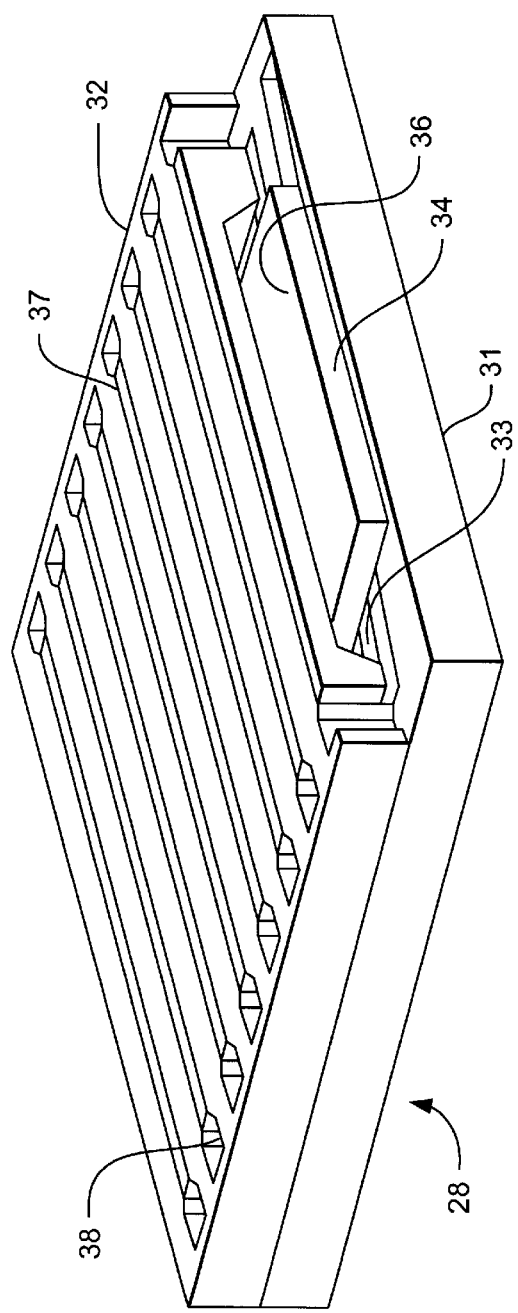
FIG. 5A is a perspective view illustrating a solenoid type portion of FIGS. 4A, 4B and 4C.
Figure 5B:
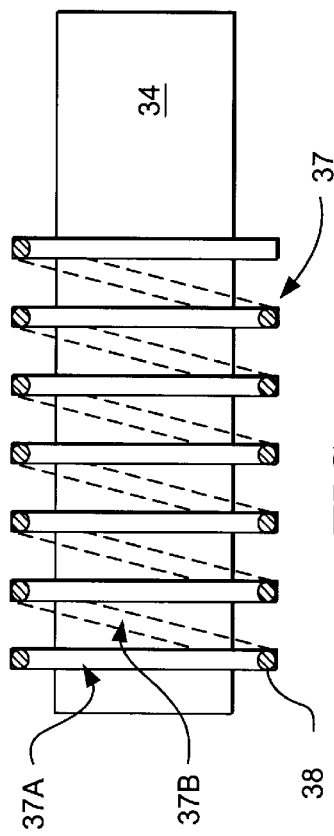
FIG. 5B is a diagrammative view of a portion of FIG. 5A.

Another type of drive actuation also illustrating the movement of the mirror 16 over the aperture 23 is in FIGS. 4A, 4B, and 4C. Here an effective solenoid MEMS type device 28 is provided. In FIG. 4A the light beam 14 is transmitted through the aperture 23. FIG. 4B shows mirror 16 in a partly operative condition and then FIG. 4C shows light beam 14 being reflected as is illustrated in FIG. 1. The structure for a solenoid type operation 28 is illustrated in FIG. 5A. Using a MEMS type construction on two silicon components, there is a lower component 31 and an upper component 32 with a U-shaped opening 33 which contains moving core of silicon 34. On top of core 34, designated 36, is a Permalloy (trademark) coating or other suitable magnetic material. This interacts with the electroplated coil 37 to provide a solenoid type movement. Coil 37 includes (see FIG. 5B) an upper set of conductive traces 37a connected by vias 38 to lower traces 37b to form an effective coil for the solenoid.

Figure 6:
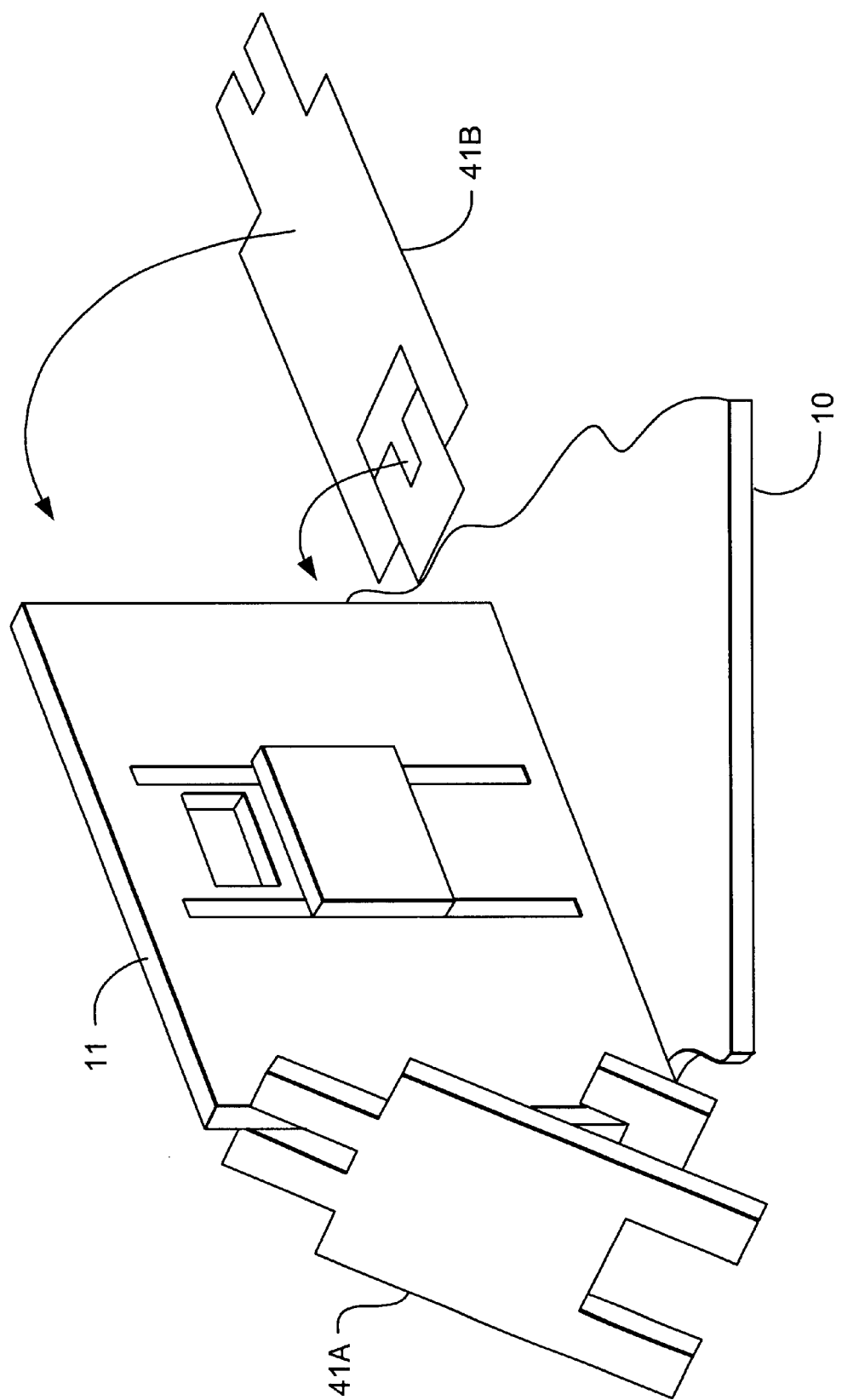
FIG. 6 is a perspective view illustrating one embodiment for mounting the portions shown in either FIG. 3 or FIGS. 4A, 4B, and 4C.
Figures 7H, 7I:
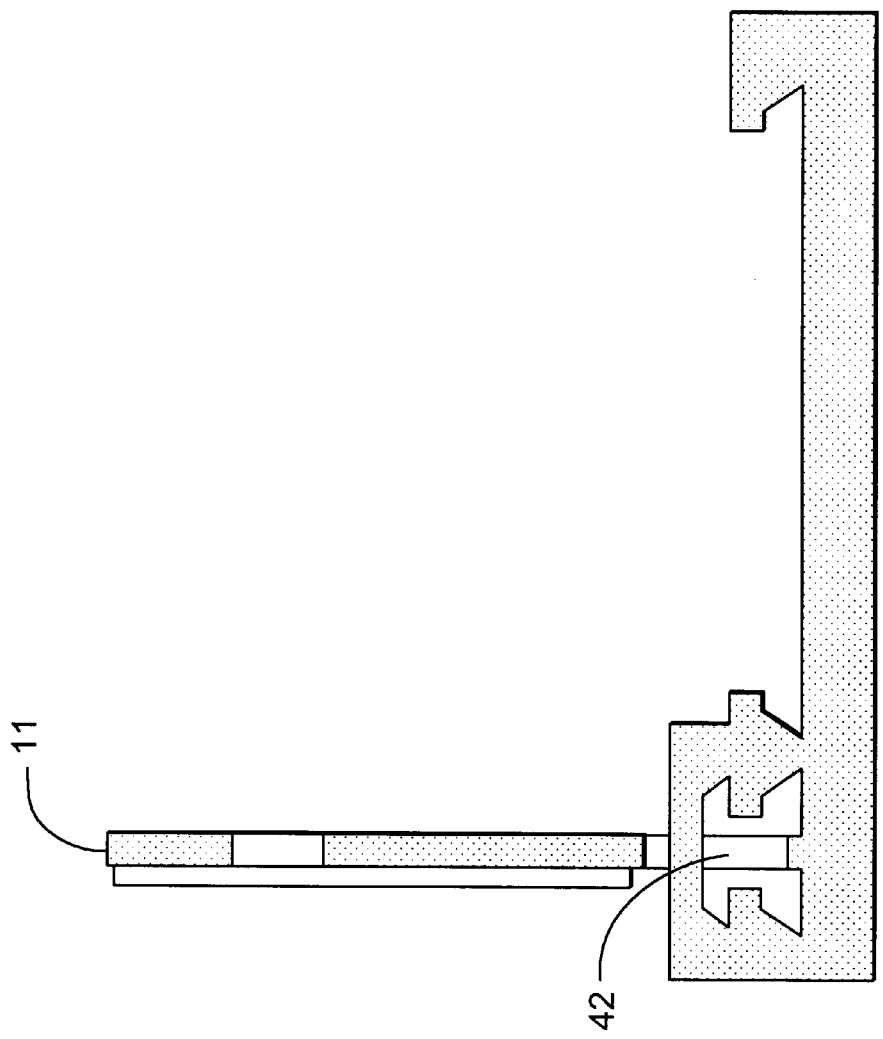

To mount mirror or shutter 11 on a substrate 10 (see FIG. 1), FIG. 6 illustrates one technique where the cross-point 11 is erected and supported by a pair of side supports 41a and 41b which maintains the mirror or shutter assembly 11 in the desired fixed vertical position. Another technique is shown in FIGS. 7A through 7I where as illustrated in FIG. 7H the mirror assembly 11 is placed in the indicated vertical slot 42. FIGS. 7A through 7I show the MEMS type construction process where in FIG. 7A the initial shutter and mirror assembly is formed as shown by the top view of FIG. 7C and this is mated to a bottom portion illustrated in FIG. 7B. In FIG. 7D and also illustrated in FIG. 7E, the mirror portion is broken out from the substrate 10 to form the final vertical mirror section 11 and in FIG. 7F as shown at 46 the beginning of the vertical slot is formed with a riser 47. FIG. 7G is a top view. Finally in FIGS. 7H and 7I the cross-point shutter mirror assembly 11 is moved into the vertical slot 42.

Figure 9:
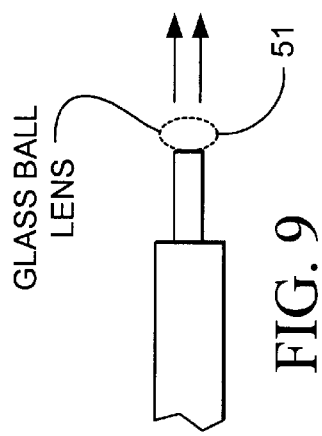
FIG. 9 is a simplified side view if an alternative lens usable in FIG. 1.
Figure 11:
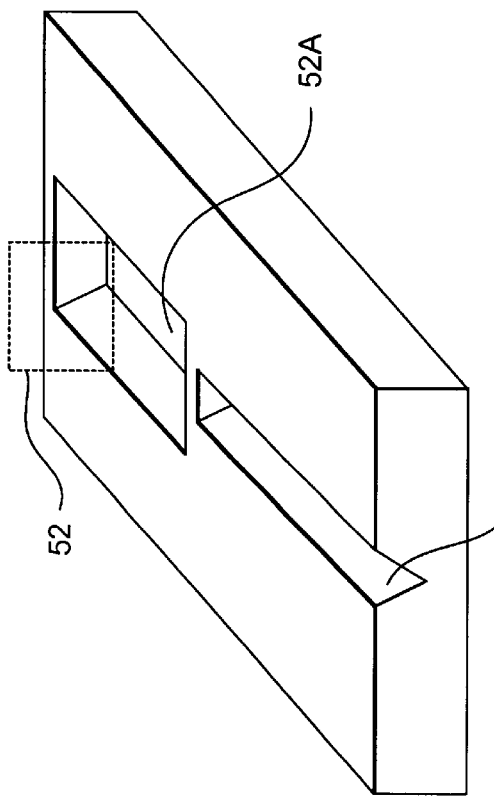
FIG. 11 is a perspective view of another optical platform.
Figure 8:
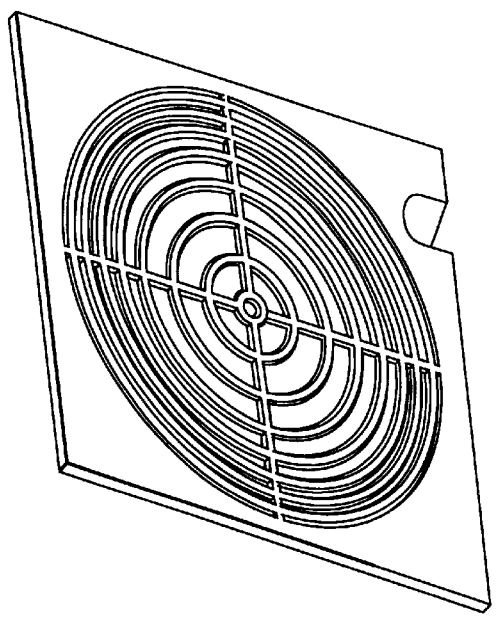
FIG. 8 is a perspective view of a lens used in FIG. 1.
Figure 10:
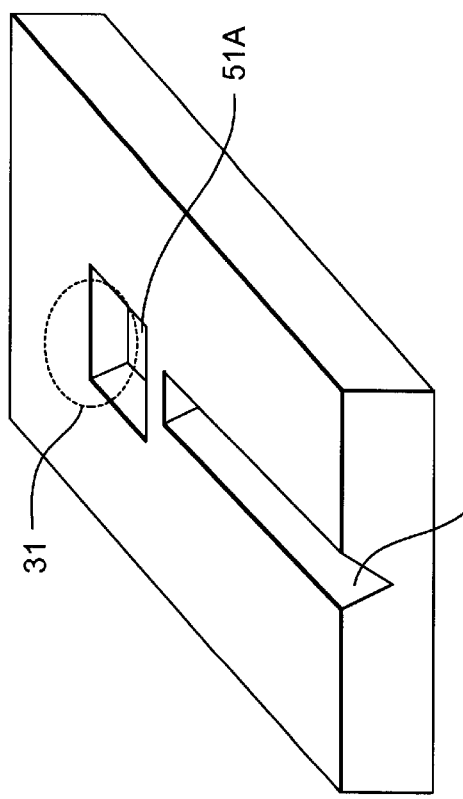
FIG. 10 is a perspective view of an optical platform.

To form a more effective switching unit, it is useful for the light beams (which of course are highly collimated) to be focused. Thus as illustrated in FIG. 8, a Fresnel lens that is integrally fabricated in the silicon may be provided at the end of the fiber optic transmission line, or in FIG. 9 a glass ball type or GRIN (gradient index) lens 52 are placed in precisely registered grooves (51a and 52a, FIGS. 10 and 11) on the optical platform. Such platform includes V-shaped slots. The ball and GRIN lenses are separate elements that would require a pick, place, and secure process during assembly.

Figure 2:
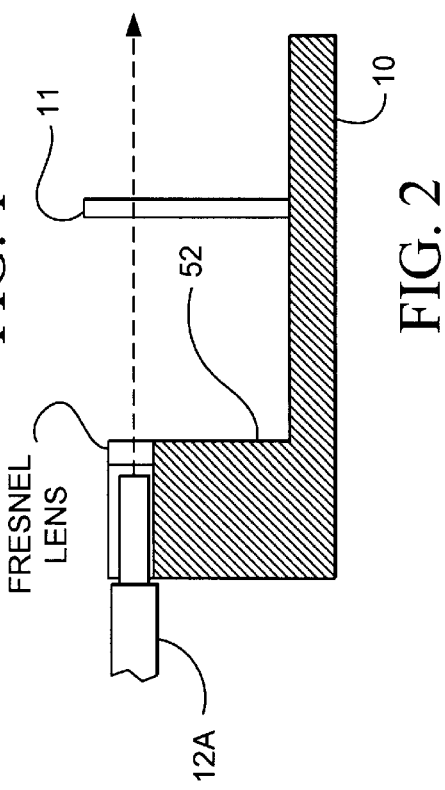
FIG. 2 is a partial cross-section of a portion of FIG. 1.

Finally to position the input and output light beams, for example 12a–12d so that the critical aperture and mirror portion of a cross-point 11 is intersected, the semiconductive substrate 10 as illustrated in FIG. 2 includes a type of raised border or scaffold 52 on which are mounted the inputs and outputs as illustrated. As illustrated in FIG. 2 the end of the fiber optic light beam path of 12a, with a Fresnel lens has been mounted.

In summary, the present invention is an improvement over prior switches because:

1. It is digital rather than analog;
2. It eliminates having to slew mirrors to different angles; and
3. It achieves higher speed switching while maintaining accurate reflective angles.

The foregoing is accomplished in the present invention by:

1. Fixing the mirrors in an n×n matrix at precise stationary planes at precise angles; and
2. The mirrors are only moved in the plane of the fixed angle in digital on-off fashion.

What is claimed is:

1. In an optical matrix switch having a plurality of cross-points for switching a plurality of information carrying light beams between any one of a plurality of input beams to any one of a plurality of output beams by choosing the appropriate cross-point of the matrix, each cross-point including an apertured semiconductive substrate fixed at a predetermined and precise angle, each cross-point including a micro electromechanical (MEM) type mirror having a first position where said mirror reflects said selected input beam to provide a selected one output beam and a second position where it provides a path through said apertured substrate path for transmission of said light beam, said cross-point mirror being in the form of a mirrored shutter digitally moveable in a single plane along the surface of said apertured substrate between a first position into said beam path and a second position out of said beam path in a stationary plane at said predetermined and fixed precise angle to said beam path, means for actuating a said selected cross-point mirror to said first position to reflect said input beam to said output beam and for causing the remaining mirrors in the path of such beam remain in the second position to allow through transmission through said apertured substrate.

2. A matrix switch as in claim 1 where said shutter is moved from one position to the other by an electrostatic comb actuator.

3. A matrix switch as in claim 1 including means for supporting said shutter in a slot in said micro circuit for maintaining it in a vertical position.

4. A matrix switch as in claim 1 including means for maintaining said shutter in a vertical position by side supports.

5. A matrix switch as in claim 1 where said beam path includes a collimating lens means.

6. A matrix switch as in claim 5 where said collimating lens is in the form of a glass ball.

7. A matrix switch as in claim 5 where said collimating lens is fully integratable of the Fresnel type.

8. A matrix switch as in claim 5 where said collimating lens is positioned precisely with photolithographically defined relief grooves.

9. A matrix switch as in claim 1 where said light beams are carried by fiber optic cables and including means for mounting cables for both input and output light beams on scaffold means for mounting them at an appropriate level to intersect said cross-point mirrors.

10. A matrix switch as in claim 1 where said shutter is moved from one position to another by a solenoid.

11. A matrix switch as in claim 10 where said solenoid includes a movable semiconductive core coated with a ferromagnetic material sandwiched between a pair of semiconductive layers having interconnected conductive traces to form an effective coil of said solenoid.

12. A method of switching a selected one of plurality of input optical paths to a selected one of plurality of output optical signal paths comprising the steps of providing a matrix of apertured substrates fixed at a predetermined and precise angle at all cross-points, providing a matrix of optical mirrors at all cross-points of said input and output optical paths; selectively and digitally moving along the surface of said apertured substrate one of said mirrors into an optical path, and allowing the remaining mirrors in said optical path to provide through transmission through said apertured substrates.

13. A method as in claim 12 where said mirrors are plasma etched.

* * * * *